(12) United States Patent
Heimberger et al.

(10) Patent No.: US 10,635,896 B2
(45) Date of Patent: Apr. 28, 2020

(54) METHOD FOR IDENTIFYING AN OBJECT IN A SURROUNDING REGION OF A MOTOR VEHICLE, DRIVER ASSISTANCE SYSTEM AND MOTOR VEHICLE

(71) Applicant: VALEO Schalter und Sensoren GmbH, Bietigheim-Bissingen (DE)

(72) Inventors: Markus Heimberger, Bietigheim-Bissingen (DE); Perikles Rammos, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 98 days.

(21) Appl. No.: 16/062,978

(22) PCT Filed: Dec. 16, 2016

(86) PCT No.: PCT/EP2016/081409
§ 371 (c)(1),
(2) Date: Jun. 15, 2018

(87) PCT Pub. No.: WO2017/103096
PCT Pub. Date: Jun. 22, 2017

(65) Prior Publication Data
US 2019/0012537 A1      Jan. 10, 2019

(30) Foreign Application Priority Data
Dec. 16, 2015 (DE) .............. 10 2015 121 952

(51) Int. Cl.
*G06K 9/00* (2006.01)
*G06T 7/246* (2017.01)
(Continued)

(52) U.S. Cl.
CPC ..... *G06K 9/00369* (2013.01); *G06K 9/00342* (2013.01); *G06K 9/00791* (2013.01);
(Continued)

(58) Field of Classification Search
CPC ........... G06K 9/00369; G06K 9/00342; G06K 9/00791; G06K 9/4604; G06K 9/4661;
(Continued)

(56) References Cited

U.S. PATENT DOCUMENTS 6,285,778 B1 * 9/2001 Nakajima ............ G05D 1/0248
180/167
2015/0098634 A1 4/2015 Ohsuga
(Continued)

FOREIGN PATENT DOCUMENTS

DE      101 60 719 A1    6/2003
DE      103 24 895 A1    12/2004
(Continued)

OTHER PUBLICATIONS

Junqiu Wang and Yasushi Yagi "Shadow extraction and application in pedestrian detection", EURASIP Journal on Image and Video Processing 2014 (Year: 2014).*
(Continued)

*Primary Examiner* — Khai M Nguyen
(74) *Attorney, Agent, or Firm* — Osha Liang LLP

(57) ABSTRACT

The invention relates to a method for identifying an object (3) in a surrounding region (4) of a motor vehicle (1) as a pedestrian (5), in which the surrounding region (4) is captured in images (B) by means of at least one vehicle-side camera (6), wherein a shadow (11) that is projected from the object (3) onto a ground (12) in the surrounding region (4) and a contrast pattern (13) that is formed on the ground (12) and depends on the shadow (11) are detected in at least one of the captured images (B) and the object (3) is identified on the basis of a comparison of the contrast pattern (13) that was formed with a predetermined contrast pattern that
(Continued)

Figure 1:
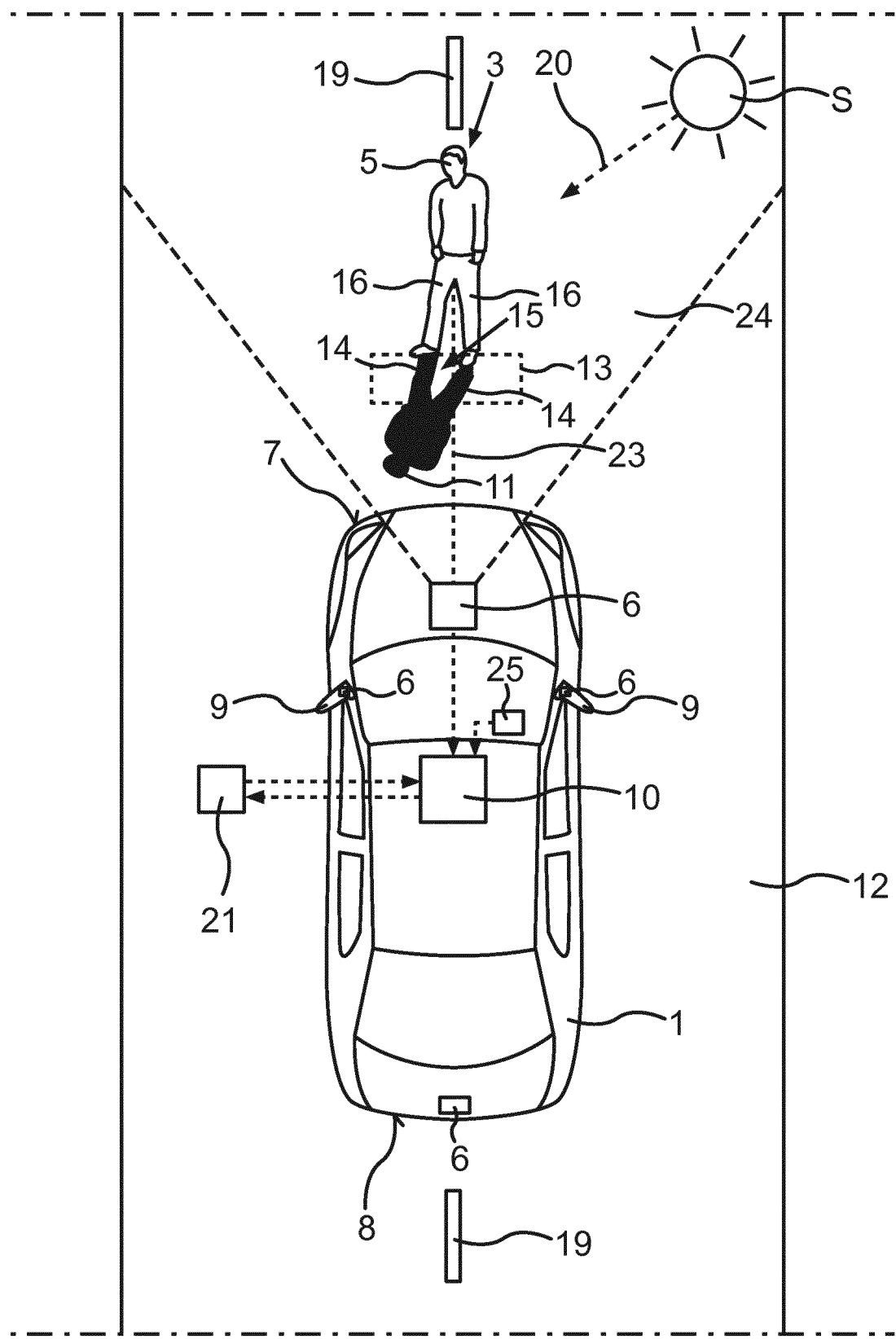

characterizes a pedestrian (5). The invention moreover relates to a driver assistance system (2) and a motor vehicle (1).

12 Claims, 2 Drawing Sheets

(51) Int. Cl.
*G06T 7/73* (2017.01)
*G06K 9/46* (2006.01)
*G06T 7/60* (2017.01)
*B60T 7/12* (2006.01)

(52) U.S. Cl.
CPC ......... *G06K 9/4604* (2013.01); *G06K 9/4661* (2013.01); *G06T 7/246* (2017.01); *G06T 7/60* (2013.01); *G06T 7/73* (2017.01); *B60T 7/12* (2013.01); *G06T 2207/30196* (2013.01); *G06T 2207/30252* (2013.01)

(58) Field of Classification Search
CPC .. G06T 7/246; G06T 7/73; G06T 7/60; G06T 2207/30196; G06T 2207/30252; B60T 7/12

See application file for complete search history.

(56) References Cited

U.S. PATENT DOCUMENTS

| | | | | |
|---|---|---|---|---|
| 2015/0248590 A1* | 9/2015 | Li | .................... | G06K 9/00785 382/103 |
| 2016/0086033 A1* | 3/2016 | Molin | ................ | G06K 9/00671 345/419 |
| 2016/0086040 A1* | 3/2016 | Kuehnle | ............ | G06K 9/00805 382/103 |
| 2016/0090085 A1* | 3/2016 | Ike | ......................... | G08G 1/166 701/36 |
| 2017/0217394 A1* | 8/2017 | Shima | ..................... | B60R 21/00 |

FOREIGN PATENT DOCUMENTS

| | | |
|---|---|---|
| DE | 10 2006 003 538 B3 | 7/2007 |
| DE | 10 2008 062 915 A1 | 7/2010 |
| DE | 11 2012 002 885 T5 | 3/2014 |
| DE | 10 2013 112 163 A1 | 5/2014 |
| DE | 11 2013 002 354 T5 | 4/2015 |
| JP | 2002-074595 A | 3/2002 |
| JP | 2013-115738 A | 6/2013 |
| JP | 2015-041222 A | 3/2015 |
| JP | 2015-075916 A | 4/2015 |

OTHER PUBLICATIONS

International Search Report issued in PCT/EP2016/081409 dated Feb. 27, 2017 (2 pages).
Written Opinion of the International Searching Authority issued in PCT/EP2016/081409 dated Feb. 27, 2017 (10 pages).
German Search Report issued in DE 10 2015 121 952.2 dated Sep. 20, 2016 (10 pages).
Office Action in corresponding Japanese Application No. 2018-531632, dated Sep. 27, 2019 (5 pages).

* cited by examiner

METHOD FOR IDENTIFYING AN OBJECT IN A SURROUNDING REGION OF A MOTOR VEHICLE, DRIVER ASSISTANCE SYSTEM AND MOTOR VEHICLE

The invention relates to a method for identifying an object in a surrounding region of a motor vehicle as a pedestrian, in which the surrounding region is captured in images by means of at least one vehicle-side camera. Moreover, the invention relates to a driver assistance system and a motor vehicle.

The prior art has already disclosed the practice of capturing objects in a surrounding region of a motor vehicle and providing information about the objects, for example to a driver assistance system of the motor vehicle. By way of example, such a driver assistance system can be an electronic braking assistant with a pedestrian detection. In particular, the braking assistant is designed to lower the speed of the motor vehicle when a distance of a captured pedestrian drops below a predetermined value. By way of example, this can prevent a crash with the pedestrian or at least significantly reduce the risk of injury to the pedestrian. To this end, it is necessary, in particular, for the object to be reliably identified as a pedestrian. Consequently, it is possible, for example, to prevent the speed of the motor vehicle being unnecessarily reduced when the motor vehicle drives past a tree, for example. A method for object detection, for example for pedestrian detection (PD), is known for example from DE 10 2013 112 163 A1.

However, methods known per se according to the prior art are usually disadvantageous in that the complete pedestrian must usually be detected in order to be able to carry out a reliable object detection.

It is an object of the present invention to identify an object as a pedestrian in a particularly simple and reliable manner.

According to the invention, this object is achieved by a method, a driver assistance system and a motor vehicle according to the independent patent claims.

A method according to the invention serves to identify an object in a surrounding region of a motor vehicle as a pedestrian. In the method, the surrounding region of the motor vehicle is captured in images by means of at least one vehicle-side camera. Moreover, a shadow that is projected from the object onto a ground in the surrounding region and a contrast pattern that is formed on the ground and depends on the shadow are detected in at least one of the captured images and the object is identified on the basis of a comparison of the contrast pattern that was formed with a predetermined contrast pattern that characterizes a pedestrian.

Thus, the method serves to classify a detected object. By means of the method, it is possible to distinguish whether the detected object is a pedestrian or another object, for example a tree or a traffic sign. In the method, the surrounding region of the motor vehicle is captured in images by means of at least one camera. In particular, provision is made of four cameras, wherein one camera can be arranged at a front region of the motor vehicle for capturing the surrounding region in front of the motor vehicle, one camera can be arranged at a tail region of the motor vehicle for capturing the surrounding region behind the motor vehicle and one camera can be arranged in each case in respectively one side mirror of the motor vehicle for capturing a driver-side and a front-passenger-side surrounding region of the motor vehicle. Consequently, it is possible to monitor the surrounding region of the motor vehicle, in particular in a complete and gap-free manner.

Here, within the scope of the method, the object in the at least one image is not identified on the basis of the detected object itself, but instead it is identified on the basis of the contrast pattern on the ground, said contrast pattern depending on the shadow that the object casts on the ground. By way of example, the ground can be a roadway of the motor vehicle or a footpath for the pedestrian. The contrast pattern is produced by virtue of the ground being darkened in regions by the shadow and illuminated in regions. Here, in particular, the contrast pattern comprises the regions on the ground that are darkened by the shadow and the non-darkened or illuminated regions adjoining the darkened regions. These light/shadow transitions or light/dark transitions are detected by a driver-side image processing device, for example, and compared to the predetermined contrast pattern, which comprises light/shadow transitions that are characteristic for a pedestrian. Thus, the predetermined contrast pattern corresponds to a contrast pattern that would be produced on the ground by means of a shadow of a pedestrian. If the detected contrast pattern corresponds to the characterizing contrast pattern or if the detected contrast pattern deviates from the characterizing contrast pattern by no more than a predetermined tolerance value, the detected object is identified as a pedestrian. Here, the invention is based on the discovery that the light/dark transitions or light/dark curves, which are formed by the contrast pattern, can be detected quickly and easily. Consequently, the object can be quickly and easily identified as a pedestrian.

Particularly preferably, the object is identified as a pedestrian if two dark stripes that extend substantially parallel or next to one another and a brighter stripe lying therebetween are detected as the predetermined contrast pattern in the contrast pattern that is produced by the shadow of the object. Expressed differently, this means that the two dark stripes or the stripe-shaped region are each embodied adjacent to the bright stripe or stripe-shaped region. Consequently, this results in a dark/bright/dark profile, which can be identified by the image processing device.

Here, in particular, the two dark stripes extending in parallel are the shadows of the legs of the pedestrian, by means of which the ground is darkened in regions. The bright stripe lying therebetween is formed by virtue of, for example, light or sunlight shining through the legs of the pedestrian. The ground is illuminated by this sunlight that shines between the legs. The advantage that only the legs of the pedestrian or only the shadow of the legs of the pedestrian have to be detected for identifying the object as a pedestrian emerges from this embodiment. Consequently, it is possible, for example, to use one of the two cameras attached to the side mirrors of the motor vehicle for the purposes of detecting the object.

According to one embodiment, the object is identified as a pedestrian if an orientation of at least one of the stripes is captured as deviating by no more than a predetermined angle from a detection axis of the camera. The detection axis of the camera or a camera axis in this case corresponds to a principal axis of a capture region of the camera. In the case of a camera in the front region of the motor vehicle or in the tail region of the motor vehicle, this detection axis extends along a vehicle longitudinal axis of the motor vehicle, in particular. In order to capture the orientation of at least one of the stripes, it is possible to capture an angle between the at least one stripe and the camera axis, in particular a projection of the camera axis on the ground. This angle can be compared to the predetermined angle. As a rule, legs of the pedestrian, who is standing in front of the camera attached to the motor vehicle, produce shadows in the form of two stripes that extend substantially in parallel, with the stripes in the process being oriented along the camera axis, in particular. This means that the angle between the at least one stripe and the camera axis is approximately 0° or it deviates from the camera axis by no more than the predetermined angle. Thus, on the basis of the orientation of the stripes, the contrast pattern can be reliably identified as the contrast pattern produced by a pedestrian and, for example, not be confused with a contrast pattern of a street marking. Since the angle between the camera axis and the at least one stripe changes, in particular, when the pedestrian is moving, for example crossing the roadway, or when the motor vehicle is moving, it is additionally possible to determine whether the pedestrian is moving or standing still on the basis of the captured angle and a captured speed of the motor vehicle.

Provision can also be made for a respective length and/or a respective width of at least one of the stripes to be captured and the object to be identified as a pedestrian if the respective length and/or the respective width deviates by no more than a specified value from a length and/or width that is predetermined for the specified contrast pattern. Plausible values that are usual or characteristic for a person can be specified for the width and/or length, which depends on a dimension of the legs. On the basis of the captured width and/or captured length, it is consequently possible to check the plausibility as to whether the stripe is the shadow of a leg. In particular, the contrast pattern of the pedestrian can be distinguished from a contrast pattern of a street marking, which, for example, is represented by a white stripe on the roadway and which likewise produces a contrast pattern in the form of a dark/light/dark transition, on the basis of capturing the width and/or the length of the dark stripe of the contrast pattern. It is possible to assign the contrast pattern to a pedestrian in a particularly simple manner by means of the comparison of the predetermined length and/or the predetermined width with the specified values. Consequently, the method is designed in a particularly reliable fashion.

Preferably, a current direction of light incidence of sunlight is determined in relation to the motor vehicle and the characteristic contrast pattern is determined depending on the determined direction of light incidence. Here, the invention is based on the discovery that the detected contrast pattern is dependent on the direction of light incidence of the sunlight, for example on the current sun position of the sun. In particular, an orientation of the stripe of the contrast pattern depends on the direction of light incidence. Here, it is possible, for example, to save a contrast pattern that is specific to the direction of light incidence and that characterizes a pedestrian for each direction of light incidence and, depending on the current direction of light incidence, to use the corresponding saved contrast pattern for comparison with the captured contrast pattern.

By way of example, the direction of light incidence can be determined on the basis of the basic brightness or brightness of the image captured by the at least one camera. This brightness can be detected by the at least one camera itself and/or by the image processing device. Provision can also be made for the direction of light incidence to be detected by means of a vehicle-side rain-light-tunnel sensor and/or by means of a vehicle-side sun position sensor. Additionally, an Internet-based weather database, for example, in which current weather data are saved, can be called by a vehicle-side control device of the driver assistance system. On the basis of the weather data saved in the weather database, it is possible to determine a sun position present at a current position of the motor vehicle at the current time and hence the current direction of light incidence depending on an orientation of the motor vehicle. By way of example, the position of the motor vehicle and the orientation of the motor vehicle can be determined by means of a vehicle-side GPS appliance. Consequently, it is possible to determine the characterizing contrast pattern, on the basis of which the object can be reliably classified.

In an advantageous embodiment of the invention, a position of the object identified as a pedestrian is determined in a surrounding map representing the surrounding area on the basis of the at least one image and the object is identified as a pedestrian on the basis of the shadow of the object and of the contrast pattern that is formed in at least one further image for the purposes of tracking the pedestrian and a further position of the object is determined in the surrounding map on the basis of the at least one further image. Here, in particular, the surrounding map is a virtual map in which positions and geometric dimensions of captured objects, for example, in particular distances of the captured objects relative to the motor vehicle, are plotted in the surrounding region. The driver assistance system of the motor vehicle can provide assistance functions, for example the automatic emergency stop or an autonomous parking process, on the basis of the surrounding map. The positions of the pedestrian over time are tracked and plotted in the surrounding map on the basis of the at least two images that were recorded by the camera. Expressed differently, this means that a movement profile of the pedestrian is determined. Thus, the pedestrian is tracked. By way of example, whether the pedestrian is standing still or moving can be determined on the basis of the positions tracked over time. By way of example, if the pedestrian is captured as standing still, it is possible to dispense with the automatic emergency stop. However, if a pedestrian movement toward the motor vehicle is captured and there is a risk of a collision with the motor vehicle, the driver assistance system can carry out the automatic emergency stop.

It was found to be advantageous if the object itself is additionally detected in at least one of the images and the object is only identified and confirmed as a pedestrian when the object is identified as a pedestrian on the basis of the object that was detected in at least one of the images and on the basis of the contrast pattern that was identified in at least one of the images. Expressed differently, this means that the identification of the object is verified on the basis of the detected contrast pattern by virtue in addition of the object itself being detected in at least one image and being identified as a pedestrian. Thus, the method of object identification comprises two partial methods. The object is identified on the basis of the contrast pattern in a first partial method and on the basis of the object itself, detected in the at least one image, in a second partial method. Methods for pedestrian identification on the basis of the captured object are known in the form of pattern detection algorithms, for example, in particular in the form of classifiers. By way of example, the so-called support vector machine (SVM) can be such a classifier. The pedestrian identification is assessed as successful and the detected object is confirmed as a pedestrian only if the object was identified as a pedestrian on the basis of both partial methods.

By way of example, if the object was only identified as a pedestrian on the basis of the first partial method but the identification of the object on the basis of the second partial method came up negative, the assumption is made that the identified contrast pattern is not the contrast pattern of a pedestrian but the contrast pattern produced by a street marking on the ground, for example. If the object was only identified as a pedestrian on the basis of the second partial method but the identification of the object on the basis of the first partial method came up negative, the assumption is made that the captured object is a different object, for example a tree. Thus, a redundancy is provided by the partial methods, by means of which the object can be reliably identified.

Preferably, the object itself and the contrast pattern are identified in the same image captured by the at least one camera and the object is identified as a pedestrian on the basis of the same image. In other words, this means that the same image, captured by the vehicle-side camera, is used for identifying the object for both partial methods. Consequently, the object can be reliably identified as a pedestrian on the basis of a single recorded image.

In a further embodiment of the invention, a process of identifying the object as a pedestrian on the basis of the identified object and a process of identifying the object as a pedestrian on the basis of the detected contrast pattern are carried out simultaneously, at least some of the time. In other words, this means that the processes of carrying out the partial methods at least partly overlap. Expressed differently, both partial methods, specifically the object identification on the basis of the contrast pattern and on the basis of the object itself, are carried out in parallel or simultaneously, at least some of the time. Consequently, an object can be identified and confirmed as a pedestrian particularly quickly.

Provision can also be made for a position of the detected object and a position of the contrast pattern to be determined in a surrounding map and for the detected object and the contrast pattern to be plotted in the surrounding map. A distance of the object relative to the motor vehicle can be determined on the basis of the position of the detected object and on the basis of the position of the contrast pattern in the surrounding map. By way of example, this distance can be made available to the driver assistance system configured as an emergency stop assistant. Moreover, whether the contrast pattern was formed by the shadow of the object on the ground, i.e., whether the contrast pattern can be assigned to the object, can be determined on the basis of the two positions.

Preferably, a projection of the detected object on the ground is determined in the surrounding map and the object is identified as a pedestrian if the projection of the object and the contrast pattern of the object that was plotted in the surrounding map overlap at least in a predetermined overlap region. This means that a shadow of the object on the ground is produced or determined artificially or virtually by means of the projection in the surrounding map, for example by way of the image processing direction. In particular, the projection can be determined taking account of the current direction of light incidence at the time of the recorded image. If the projection and the shadow of the object, i.e., the contrast pattern dependent on the artificially produced shadow and the contrast pattern dependent on the shadow of the object, overlap, at least in the predetermined overlap region, the assumption can be made that the contrast pattern on the ground was in fact produced by the object and the detected contrast pattern is not a street marking, for example. By means of the projection and the contrast pattern, it is possible in an advantageous manner to associate the pedestrians detected by the first partial method and the second partial method to an object and consequently identify the captured object more reliably as a pedestrian.

The invention moreover relates to a driver assistance system for identifying an object in a surrounding map of a motor vehicle as a pedestrian. The driver assistance system comprises at least one vehicle-side camera for capturing the surrounding region in images. Moreover, an image processing device of the driver assistance system is configured to detect a shadow that is projected from the object onto a ground in the surrounding region and a contrast pattern that depends on the shadow on the ground in at least one of the captured images and identify the object on the basis of a comparison of the contrast pattern dependent on the shadow with a predetermined contrast pattern that characterizes a pedestrian. By way of example, the driver assistance system can be configured as an automatic emergency brake assistant and can automatically brake the motor vehicle in the case of an imminent collision with an object that is identified as a pedestrian.

A motor vehicle according to the invention comprises a driver assistance system according to the invention. In particular, the motor vehicle is embodied as an automobile.

The preferred embodiments presented with reference to the method according to the invention and the advantages thereof apply accordingly to the driver assistance system according to the invention and to the motor vehicle according to the invention.

Specifications such as "top", "bottom", "front", "back", "to the side of", "front side", "rear side", etc. specify positions and orientations in the case of the intended use and intended arrangement of the at least one camera at the motor vehicle and in the case of an observer then standing in front of the motor vehicle and looking in the direction of the motor vehicle.

Further features of the invention emerge from the claims, the figures and the description of the figures. The features and feature combinations specified above in the description and the features and feature combinations specified below in the description of the figures and/or only shown in the figures can be used not only in the respectively specified combination, but also in any other combination or on their own, without departing from the scope of the invention. Consequently, embodiments of the invention that are not explicitly shown and explained in the figures but emerge, and are producible, from the explained embodiments by way of separated feature combinations should also be considered to be comprised and disclosed. Embodiments and feature combinations that consequently do not have all features of an originally phrased independent claim should also be considered to be disclosed.

Figure 2:
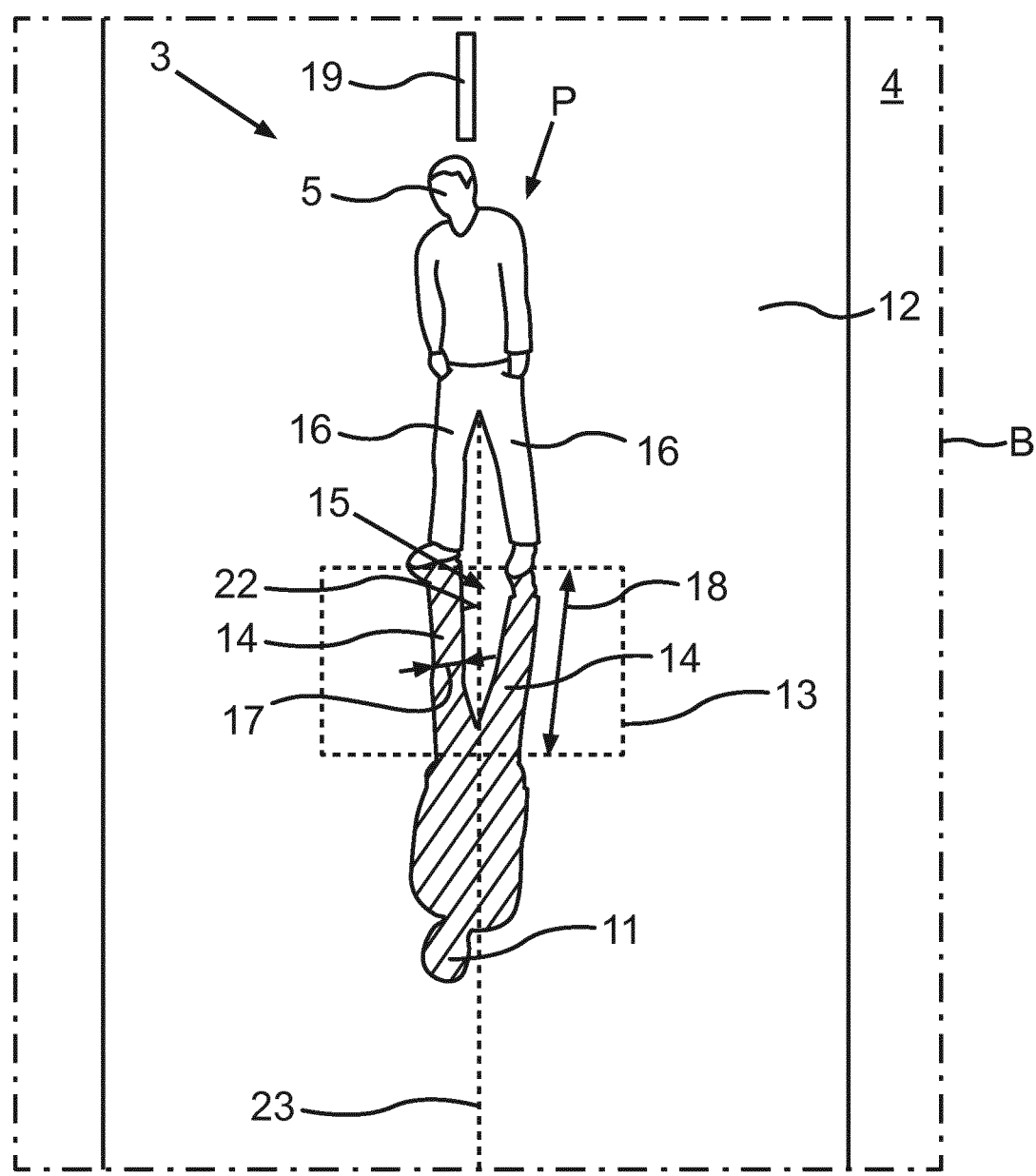

In detail:

FIG. 1 shows a schematic illustration of an embodiment of a motor vehicle according to the invention; and FIG. 2 shows a schematic illustration of an image captured by a vehicle-side camera.

In the figures, identical and functionally identical elements are provided with the same reference sign.

FIG. 1 shows a motor vehicle 1 having a driver assistance system 2. The driver assistance system 2 serves to identify an object 3 in surrounding region 4 of the motor vehicle 1 as a pedestrian 5. By way of example, the driver assistance system 2 can be configured as an automatic emergency stop assistant, which warns a driver of the motor vehicle about an imminent collision with the pedestrian 5 and/or which automatically brakes the motor vehicle 1 in the case of an imminent collision with the pedestrian. For the purposes of identifying the object 3 as a pedestrian 5, the driver assistance system 2 comprises at least one vehicle-side camera 6. In this case, the motor vehicle 1 comprises four vehicle-side cameras 6, wherein one camera 6 is arranged in a front region 7 of the motor vehicle 1. The surrounding region 4 in front of the motor vehicle 1 can be monitored by means of the camera 6. A further camera 6 is arranged at a tail region 8 of the motor vehicle 1 in order to monitor the surrounding region 4 behind the motor vehicle 1. Here, two further cameras 6 are integrated into a side mirror 9 of the motor vehicle 1 in each case such that the surrounding region 4 to the side of the motor vehicle 1 can be monitored.

The cameras 6 are designed to capture the surrounding region 4 of the motor vehicle 1 in images B, wherein an image B captured by the camera 6 in the front region 7 of the motor vehicle 1 is illustrated in exemplary fashion in FIG. 2. A shadow 11, which is projected by the object 3 onto a ground 12, is identified in the at least one captured image B by a vehicle-side image capture device 10 of the driver assistance system 2. By way of example, the ground 12 can be a roadway for the motor vehicle 1 or a footpath. The shadow 11 that is projected onto the ground 12 produces a contrast pattern 13 that is dependent on the shadow 11 on the ground 12, said contrast pattern being detected by the image processing device 10 of the driver assistance system 2 in the at least one image B. This detected contrast pattern 13 is compared to a predetermined contrast pattern that characterizes a pedestrian and the captured object 3 is identified as a pedestrian 5 on the basis of this comparison. The captured object 3 is identified on the basis of the comparison as a pedestrian 5 if the captured contrast pattern 13 deviates from the characterizing contrast pattern by no more than a predetermined value, i.e., if the captured contrast pattern 13 and the characterizing contrast pattern overlap or intersect, at least in a predetermined overlap region.

Here, the object 3 is identified as a pedestrian 5 when, in particular, the contrast pattern 13 has two dark stripes 14 or stripe-shaped regions that extend substantially parallel or next to one another and a bright stripe 15 or stripe-shaped region extending between the dark stripes 14. Here, the dark stripes 14 correspond to a darkened region on the ground 12, which is produced by the shadow of legs 16 of the pedestrian 5. Here, the bright stripe 15 extending between the dark stripes 14 corresponds to a non-darkened region on the ground 12. By way of example, this arises by virtue of light from the sun S shining between the legs 16 of the pedestrian 5 and hence illuminating the region between the two dark stripes 14. This contrast pattern 13 of, alternately, a dark, a bright and a dark region on the ground 12 is defined as characteristic for a pedestrian.

Moreover, a width 17 of at least one of the stripes 14, 15 and/or a length 18 of at least one of the stripes 14, 15 is captured. The object 3 is only identified as a pedestrian 5 if the captured width 17 and/or the captured length 18 deviates by no more than a predetermined value from a length and/or width that is prescribed for the characterizing contrast pattern. Here, the width and the length of the stripes 14, 15 are dependent on a width and length of the legs 16 of the pedestrian 5. Plausible values that are typical for a person can be prescribed as such width and length, and so the image processing device 10 can determine whether a captured width 17 and/or a captured length 18 in the contrast pattern 13 is realistic or plausible for a pedestrian. By way of example, this allows a street marking 19 on the ground, which likewise produces a contrast pattern of, alternately, a dark, a bright and a dark region on the ground 12, to be reliably distinguished from the contrast pattern 13 that depends on the shadow 11 of the pedestrian 5 since the width of the dark stripes in the contrast pattern produced by the street marking 19 is significantly larger than the width of the dark stripes 14 in the contrast pattern 13 of a pedestrian 5.

Moreover, an angle 22 between the at least one stripe 14, 15 and a detection axis 23 or camera axis of the camera 6 is captured for capturing an orientation of at least one of the stripes 14, 15. Then, the object 3 is identified as the pedestrian 5 if the orientation of the at least one stripe 14 deviates by no more than a predetermined angle from the detection axis 23, i.e., if the captured angle 22 does not exceed the predetermined angle. Here, the detection axis 23 corresponds to a principal axis of a capture region 24 of the front-side camera 6, which extends along a vehicle longitudinal direction of the motor vehicle 1 in this case. If the pedestrian 5 crosses the roadway in front of the front-side camera 6 or if the pedestrian 5 stands in front of the motor vehicle 1, and hence in front of the front-side camera 6, the stripes 14, 15 of the contrast pattern 13 extend along the detection axis 23, in particular. Thus, the object 3 is identified as a pedestrian 5 when, in particular, at least one of the stripes 14, 15 extends along the camera axis 23, i.e., if the angle 22 is approximately 0° as the predetermined angle. The angle 22 between the at least one stripe 14, 15 and the detection axis 23 can change over time, especially if the pedestrian 5 or the motor vehicle 1 is moving. On the basis of the change in angle and on the basis of a captured speed of the motor vehicle 1, it is therefore possible to capture whether the pedestrian 5 is moving or standing still.

Moreover, it is possible to determine the direction of light incidence 20 of the light from the sun S. The characterizing contrast pattern can be determined on the basis of the direction of light incidence 20. Here, the invention is based on the discovery that the shadow 11 of the object 3 that is projected onto the ground 12 depends on the direction of light incidence 20. Expressed differently, the orientation of the stripes 14, 15 depends on the direction of light incidence 20. The direction of light incidence 20 is dependent on, in particular, a sun position of the sun S. By way of example, the driver assistance system 2 can have a rain-light-tunnel sensor 25 and/or a sun position sensor, which can capture the sun position of the sun S, and hence the direction of light incidence 20, for the purposes of determining the sun position of the sun S. It is also possible to determine the direction of light incidence 20 on the basis of the image B captured by the camera 6 by virtue of the camera 6 itself, and/or the image processing device 10, capturing a basic brightness or brightness of the image B. The direction of light incidence 20 can be determined from the captured brightness. Also, provision can be made for the driver assistance system 2 to be designed to call an Internet-based weather database 21 in order to obtain current weather data at a position of the motor vehicle 1 at the current time or time of day, for example. The direction of light incidence 20 can be determined reliably on the basis of these weather data and on the basis of an orientation of the motor vehicle 1. By way of example, the position and the orientation of the motor vehicle 1 can be determined by means of a GPS device of the motor vehicle 1 (not shown here).

Additionally, a position P of the pedestrian 5 can be captured in the at least one image B and said position can be plotted in a surrounding map, which represents the surrounding region 4. The surrounding region 4 for the driver assistance system 2 can be mapped in the surrounding map; in particular, it is possible for distances of captured objects 3 from the motor vehicle 1 to be saved. In at least one further image, not illustrated here, it is possible to determine the position P of the pedestrian 5 once again and said position can likewise be plotted into the surrounding map. Consequently, it is possible to capture the position P of the pedestrian 5 over time, i.e., a movement profile of the pedestrian 5. Using this, it is possible to determine, for example, whether the pedestrian 5 is moving, for example crossing the roadway of the motor vehicle 1, or whether the pedestrian 5 is standing still. In particular, it is possible to capture the position P at which the pedestrian 5 stands and consequently it is possible to determine the distance of the pedestrian 5 relative to the motor vehicle 1. Consequently, the driver assistance system 2 can make a decision, for example, as to whether an emergency stop of the motor vehicle 1, provided by the driver assistance system 2, has to be carried out. By way of example, an emergency stop of the motor vehicle 1 is necessary when the pedestrian 5 stands on the roadway of the motor vehicle 1 or moves on the roadway and hence a collision with the motor vehicle 1 moving on the roadway becomes imminent. The emergency stop is not necessary if the pedestrian 5 stands on a footpath next to the roadway of the motor vehicle 1 and the motor vehicle 1 moving along the roadway drives past the pedestrian 5.

In order to design the pedestrian identification to be particularly reliable, it is possible to capture not only the contrast pattern 13 in the at least one image B, but also the object 3 itself. The captured object 3 can be identified as a pedestrian 5, for example by means of a classifier, on the basis of the captured object 3. By way of example, the captured object 3 can be identified as the pedestrian 5 on the basis of a comparison with a saved template. The object 3 itself can be identified as a pedestrian 5 on the basis of a pixel pattern of the image B as well. The pedestrian identification is only assessed to be successful and the captured object 3 is only confirmed as a pedestrian 5 if the object 3 was identified as a pedestrian on the basis of the contrast pattern 13 and on the basis of the object 3 itself. If the captured object 3 was only identified as a pedestrian 5 on the basis of the contrast pattern 13, but not on the basis of the object 3 itself, it may be considered probable that the captured contrast pattern 13 was produced by the street marking 19. If the captured object 3 was identified as a pedestrian 5 only on the basis of the object 3 itself, but not on the basis of the contrast pattern 13, it may be considered probable that the captured object 3 is another object, for example a tree.

In particular, provision can be made here for a process of identification on the basis of the object 3 itself and a process of the identification on the basis of the contrast pattern 13 to be carried out in the same image B. Thus, an image B can be recorded by the at least one vehicle-side camera 6, said image being provided to the image processing device 10 for the purposes of identifying the object 3. Moreover, the processes can be carried out at the same time, at least some of the time. Thus, the image processing device 10 can carry out the process of identification on the basis of the object 3 itself and the process of identification on the basis of the contrast pattern 13 in parallel by means of the image B. Consequently, the method is designed to be particularly quick.

Additionally, a projection of the object 3 on the ground 12 can be determined in the surrounding map, in which the object 3 itself and the shadow 11 or the contrast pattern 13 are plotted. A shadow of the object 3 on the ground 12 can be produced or determined artificially or virtually by the image processing device 10 by means of the projection of the object 3 on the ground 12, which, in particular, is determined depending on the current direction of light incidence 20. If the projection of the object 3 and the contrast pattern 13, i.e., the virtually produced shadow and the captured shadow 11 of the object 3, overlap at least in regions, the object 3 is identified as a pedestrian 5.

The invention claimed is:

1. A method for identifying an object in a surrounding region of a motor vehicle as a pedestrian, the method comprising:
   capturing the surrounding region in images by at least one vehicle-side camera;
   detecting a shadow that is projected from the object onto a ground in the surrounding region and a contrast pattern that is formed on the ground and depends on the shadow in at least one of the captured images; and
   identifying the object on the basis of a comparison of the contrast pattern that was formed with a predetermined contrast pattern that characterizes a pedestrian,
   wherein the object is identified as a pedestrian when two dark stripes that extend substantially parallel to one another and a brighter stripe lying therebetween are detected as the predetermined contrast pattern in the contrast pattern that depends on the shadow of the object.

2. The method according to claim 1, wherein the object is identified as a pedestrian if an orientation of at least one of the stripes is captured as deviating by no more than a predetermined angle from a detection axis of the camera.

3. The method according to claim 1, wherein a respective length and/or a respective width of the stripes is captured and the object is identified as a pedestrian if the respective length and/or other respective width deviates by no more than a specified value from a length and/or width that is predetermined for the specified contrast pattern.

4. The method according to claim 1, wherein a current direction of light incidence of sunlight is determined in relation to the motor vehicle and the predetermined contrast pattern is determined depending on the determined direction of light incidence.

5. The method according to claim 1, wherein a position of the object identified as a pedestrian is determined in a surrounding map representing the surrounding area on the basis of the at least one image and the object is identified as a pedestrian on the basis of the shadow of the object and of the contrast pattern that is formed in at least one further image for the purposes of tracking the pedestrian and a further position of the object is determined in the surrounding map on the basis of the at least one further image.

6. The method according to claim 1, wherein the object itself is additionally detected in at least one of the images and the object is only identified and confirmed as a pedestrian when the object was identified as a pedestrian on the basis of the object that was detected in at least one of the images and on the basis of the contrast pattern that was identified in at least one of the images.

7. The method according to claim 6, wherein the object itself and the contrast pattern are detected in the same image that was captured by the at least one camera and the object is identified as a pedestrian on the basis of the same image.

8. The method according to claim 6, wherein a process of identifying the object as a pedestrian on the basis of the identified object and a process of identifying the object as a pedestrian on the basis of the detected contrast pattern are carried out simultaneously, at least some of the time.

9. The method according to claim 6, wherein a position of the detected object and a position of the detected contrast pattern are determined in a surrounding map and the detected object and the contrast pattern are plotted in the surrounding map.

10. The method according to claim 9, wherein a projection of the detected object on the ground is determined in the surrounding map and the object is identified as a pedestrian if the projection of the object and the contrast pattern of the object that was plotted in the surrounding map overlap at least in a predetermined overlap region.

11. A driver assistance system for identifying an object in a surrounding region of a motor vehicle as a pedestrian, the driver assistance system comprising:
    at least one vehicle-side camera for capturing the surrounding region in images; and
    an image processing device configured to:
        detect a shadow that is projected from the object onto a ground in the surrounding region,
        detect a contrast pattern that is formed on the ground and depends on the shadow in at least one of the captured images, and
    identify the object on the basis of a comparison of the contrast pattern that was formed with a predetermined contrast pattern that characterizes a pedestrian,
    wherein the object is identified as a pedestrian when two dark stripes that extend substantially parallel to one another and a brighter stripe lying therebetween are detected as the predetermined contrast pattern in the contrast pattern that depends on the shadow of the object.

12. A motor vehicle having a driver assistance system according to claim 11.

\* \* \* \* \*